United States Patent [19]

Finkel et al.

[11] Patent Number: 4,671,839
[45] Date of Patent: Jun. 9, 1987

[54] SECURE IDENTIFICATION CARD MANUFACTURE

[75] Inventors: Joel R. Finkel, Woodland Hills; Paul F. Jacobs, La Crescenta, both of Calif.

[73] Assignee: Xerox Corporation, Stamford, Conn.

[21] Appl. No.: 812,686

[22] Filed: Dec. 23, 1985

[51] Int. Cl.$^4$ ............................................. B32B 31/06
[52] U.S. Cl. ..................................... 156/257; 235/488
[58] Field of Search .................. 40/547; 156/250, 257, 156/264, 296; 362/32; 235/380, 487-490

[56] References Cited

U.S. PATENT DOCUMENTS

| | | | |
|---|---|---|---|
| 2,429,897 | 10/1947 | Saunders et al. | 156/257 |
| 2,508,128 | 5/1950 | Waards | 156/257 |
| 3,022,207 | 2/1962 | Lang | 156/257 |
| 3,728,521 | 4/1973 | Borough et al. | 235/487 |
| 4,138,057 | 2/1979 | Atalla | 235/380 |
| 4,138,058 | 2/1979 | Atalla | 235/380 |

Primary Examiner—Ivars Cintins
Attorney, Agent, or Firm—Franklyn C. Weiss

[57] ABSTRACT

A process for manufacturing secure identification cards incorporating fiber optic elements which allow the generation of a binary encoded electro-optical signal uniquely identifying that card. Blank card stock will be made from a continuous web system in which the fibers 130 are aligned and brought to an appropriate spacing by combing 134 as they are drawn into the forming machine. The formed web stock is passed through bonding rollers 138 (either thermal or pressure) and then enters a take-up accumulator 150 and then to a punch where the blank forms are punched out of the web. The accumulator stage 150 compensates for the conversion from smooth motion through aligning, mating, and bonding areas to an intermittent motion at the punch area.

7 Claims, 4 Drawing Figures

SECURE IDENTIFICATION CARD MANUFACTURE

This invention relates to the manufacturing process for manufacturing secure identification cards incorporating fiber optic elements which allow the generation of a binary encoded electro-optical signal uniquely identifying that card. The manufactured card would look like a standard card except that the card would include an array of N many optical fibers.

BACKGROUND OF THE INVENTION

The use of credit cards in modern society has become standardized in that users purchase items or services on credit rather than carry large amounts of cash. The use of identification cards has become so important in the process of authentication that a specific individual can conduct an electronic transaction or enter a controlled access area.

With the rapid advent of these cards, a security problem is generated also. Cards are lost and stolen and sometimes counterfeited. The losses from the use of lost or stolen or counterfeited card are now running annually in the hundreds of millions of dollars. There have been prior art attempts to supply unique cards that cannot be counterfeited and if stolen would be unusable by the possessor. One such card is disclosed in U.S. Pat. No. 3,728,521, Apr. 17, 1973, entitled Encoded Card Employing Fiber Optic Elements. The patent discloses a credit card having a layer of light transmitting elements such as fibers extending between two edges, the fibers being individually capable of transmitting magnetic radiant energy, in the visible, ultraviolet, or infrared spectral regions.

According to the present invention, a method is disclosed of manufacturing a plastic secure identification card, utilizing fiber optic elements, which would allow the generation of a binary coded electro-optical signal uniquely identifying that card. The present concept utilizes a device much like a standard credit card except that the plastic card would include an array of N many optical fibers. Disclosed herein are the actual initial manufacturing processes for use in making these cards. Grooves to receive the optical fibers, such as those with a 'vee' cross-sectional configuration, are formed in a substrate and superstrate to receive a series of discrete optical fibers. Other groove configurations can be used as well. The fibers would be laid in a parallel manner at some distance from one another. Once the fibers have been laid into the grooves in the substrate card layer, the superstrate layer is positioned approximately above the substrate so that their grooves are aligned and a closest fit containing the fiber within the upper and lower grooves will be obtained. The two layers will be bonded together by thermal or adhesive means depending on the characteristics of the materials used.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
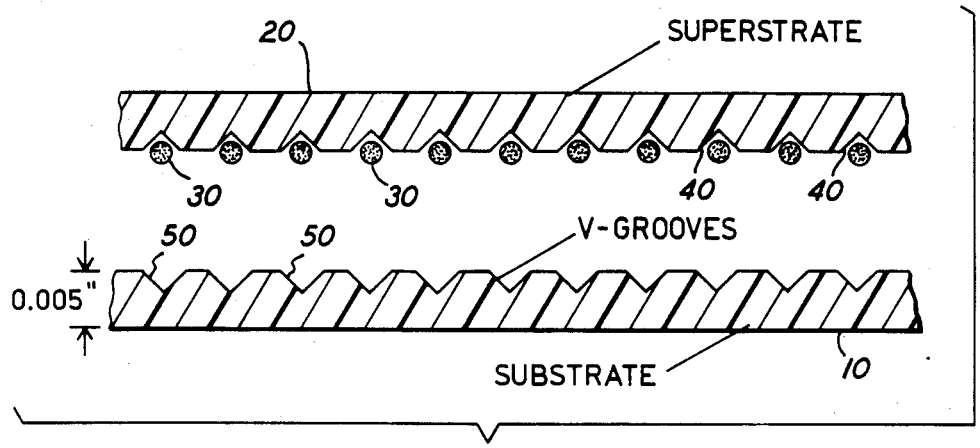
FIG. 1 is a partial side view of a source identification card utilizing the principles of the present invention just prior to joining the upper and lower layers.
Figure 2:
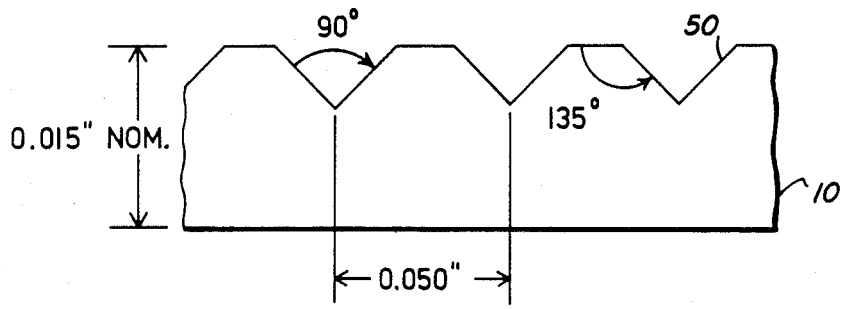
FIG. 2 is a standard view of three of the v-grooves in which the optical fibers are placed.

In manufacturing the encoded secure identification cards, in accordance with the principles of the present invention, it is necessary to use a substrate 10 and superstrate 20 and a series of discrete optical fibers 30. See FIGS. 1 and 2. The fibers will be laid in a parallel manner at some distance from one another; the center line to center line distance should be at least 1.5 times the diameter of the optical fiber, yet less than about 5 to 10 times the diameter of the fiber. Thus, if the optical fiber has a diameter equal to 0.005 inches (0.0127 centimeters), the center to center line distance should be at least 0.0075 inches (0.0191 centimeters), yet less than 0.050 inches (0.127 centimeters).

The preferred way to prepare the card would be to form parallel v-shaped grooves in the mating surfaces. While the present discussion centers upon the use of V-grooves, any other configuration that accommodates the optical fibers could be used equally as well. The "v's" should be configured to hold the optical fibers in a relatively fixed orientation when they are laid into the grooves; matching grooves in the superstrate will complete the holding in place of the fibers. The use of the "v's" will minimize the effect of fiber size on overall thickness of the assembled card; the fiber will be immersed in the bodies of the super and substrates. Assuming an optical fiber diameter of 0.10 inches (0.0254 centimeters), the V-grooves should be 90 degree right angles approximately 0.007 inches (0.0-1778 centimeters) deep; the exact depth to be dependent upon the diameter of the fiber, the thickness of the sub and superstrate pieces, the thickness of the bonding film, and the desired thickness of the card. The nominal industry standard thickness is 0.030±0.003 inches.

Once the fibers have been laid into the grooves 50 in the substrate card layer, the superstrate layer is positioned appropriately above the substrate so that their grooves 40 are aligned and a closest fit containing the fibers within the upper and lower grooves will be obtained. The two layers will be bonded together either by thermal or adhesive means depending upon the characteristics of the materials used. It is anticipated that the super 20 and substrate 10 layers will be a polymeric material such as might be used in the now prevalent forms of credit cards; these include but are not limited to materials such as polyvinyl-chloride, polyvinyl-acetate or polyvinyl-alcohol polyesters, polyethylenes, etc. The optical fibers could be made from material such as glass, quartz, or polymers such as polymethylmethacrylate, polycarbonate, polypropylene, polystyrene, etc.

Figure 3:
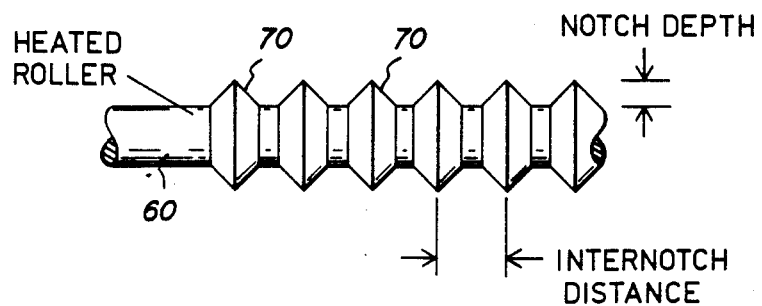
FIG. 3 is the heated roller with v-shaped configurations in a male orientation which could be used to form the v-grooves.

The grooves would be formed in the super and substrates by heated rollers with "v-shaped" configurations 70 in a male orientation that will force a series of female "v-shaped" grooves; Actually, a series of notches, most likely uniformly spaced from one another; although uniformity of the inter-groove distance is not necessary. Uniformity from piece of formed matrix material to another is important to guarantee reproducibility from one finished card to the next. See FIG. 3. The roller 60 is maintained at a temperature sufficient to soften the polymer material and, thereby, facilitate formation of the grooves without deforming the materials, e.g. warping or distortion of what will be the exposed faces of the cards' surfaces.

Figure 4:
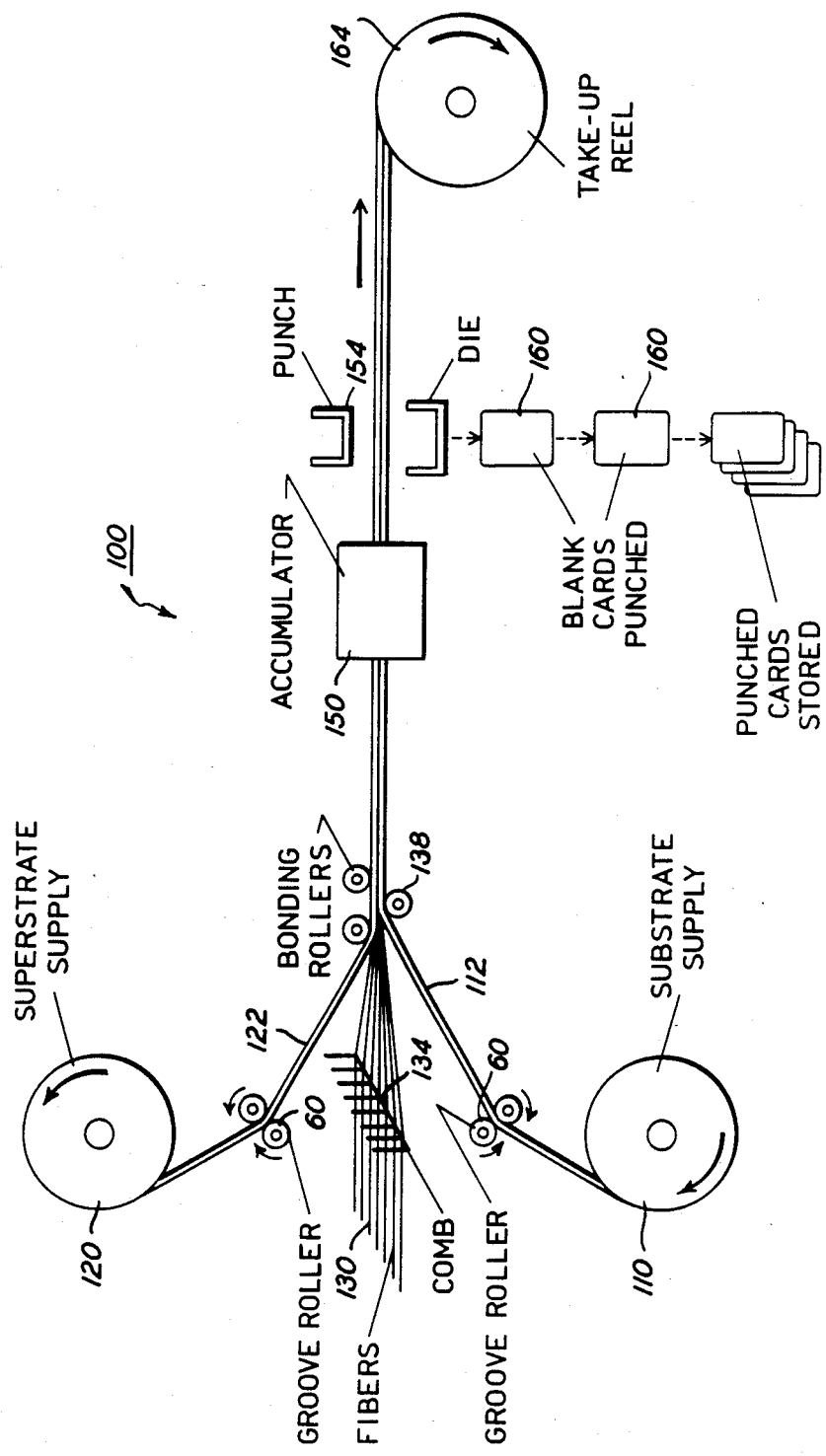
FIG. 4 is a schematic diagram of the manufacturing system utilized in manufacturing the identification cards within the principles of the present invention.

FIG. 4 shows a side schematic view of the apparatus 100 to be used in preparing the various materials into the final encoded optical fiber secure identification card. Roller 110 will supply the substrate material 112, while roller 120 supplies the superstrate material 122. Blank card stock will made from a continuous web system in which the fibers 130 are aligned and brought to an appropriate spacing by combing 134 as they are drawn into the forming machine. The fibers or the substrate are precoated with a tacky or adhesive material to facilitate their adherence to the grooves in the substrate and superstrate layers. Traction is provided by the bonding rollers 138. The groove rollers 60 supply the grooves as set forth above in conjunction with FIG. 2.

The formed web stock is passed through bonding rollers 138 (either thermal or pressure) arranged in such a manner as to flatten and straighten the web stock which then enters a take-up accumulator 150 stage that will compensate fo the conversion from smooth motion through the aligning, mating, and bonding areas to an intermittent through the punch area where the blank forms are punched out of the web by the punch 154 and die 156 set. The punched out blanks 160 fall into a blank card holding cassette where they are accumulated until full and the loaded cassette replaced with an empty one. The remaining web stock is gathered into a take-up spool 164 as spoilage for reprocessing.

All pieces of the blank card stock have all of the desired number and configuration of optical fibers discretely running through them. Individual fibers will become bereft of their transmission capability in a manner to be determined by the random electronic positioning system. That is, the individual fibers will be disabled in any of several different manners including, but not limited to, mechanical punching, stabbing, ultrasonic disintegration, disruption by laser either drilling through the face of the card or burning through the fiber axially or perpendicularly to the axis of the fiber, or laser induced photochemical reaction of a dye incorporated into the fibers.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A process for manufacturing secure identification cards incorporating fiber optic elements comprising:

forming grooves in either or both of substrate or superstrate card stocks, said grooves being formed by passing said substrate and superstrate card stocks over a heated roller or rollers with shaped protuberances in a male orientation to create a series of female shaped grooves in said card stocks, maintaining said heated roller or rollers at a temperature sufficient to soften said card stock and facilitate formation of said grooves without deforming said card stock, precoating a series of discrete optical fibers with a tacky or adhesive material to facilitate the adherence of said fibers, combining said discrete optical fibers into an array matching the grooves formed in either or both of said substrate and superstrate card stocks, first positioning the optical fibers in said grooves of said substrate or superstrate card stocks containing said grooves, second positioning the other of said substrate or superstrate card stocks onto the card stock containing the grooves such that the optical fibers are aligned in said grooves, said grooves being longitudinal to the direction of travel of said card stocks, mating said substrate and superstrate card stocks, bonding said substrate and superstrate card stocks together such that a continuous web is formed, accumulating said continuous web so as to convert the smooth motion of said card stock into an intermittent motion, punching out discrete forms from said continuous web, said forms comprising said secure identification cards, and disabling individual ones of said optical fibers to eliminate the transmission caspability of said individual one or ones thereof.

2. A process as set forth in claim 1 wherein said grooves are v-shaped.

3. The process for manufacturing said secure identification cards as set forth in claim 1 wherein said step of disabling includes:

punching a hole or holes through said card to interrupt said individual one or ones of said optical fibers.

4. The process for manufacturing secure identification cards as set forth in claim 1 wherein said step of disabling includes:

ultrasonically disintegrating said individual one or ones of said optical fibers.

5. The process for manufacturing secure identification cards as set forth in claim 1 wherein said step of disabling includes burning a hole or holes through said card to interrupt said individual one or ones of said optical fibers.

6. The process for manufacturing secure identification cards as set forth in claim 5 wherein said step of burning includes the use of a laser beam through said card.

7. The process for manufacturing secure identification cards as set forth in claim 5 wherein said step of disabling includes the laser induced photochemical reaction of a dye incorporated into the fibers.

* * * * *